(12) United States Patent
Yu et al.

(10) Patent No.: US 9,089,837 B2
(45) Date of Patent: Jul. 28, 2015

(54) METHOD OF FABRICATING A HIGH-TEMPERATURE $CO_2$ CAPTURE AGENT

(71) Applicant: Institute of Nuclear Energy Research, Atomic Energy Council, Executive Yuan, R.O.C., Taoyuan County (TW)

(72) Inventors: Ching-Tsung Yu, Taoyuan County (TW); San-Yuan Chen, Hsinchu (TW); Wei-Chin Chen, Miaoli County (TW); Po-Hsueh Chang, Yunlin County (TW)

(73) Assignee: INSTITUTE OF NUCLEAR ENERGY RESEARCH, ATOMIC ENERGY COUNCIL, Lungtan, Taoyuan (TW)

( * ) Notice: Subject to any disclaimer, the term of this patent is extended or adjusted under 35 U.S.C. 154(b) by 1 day.

(21) Appl. No.: 14/041,528

(22) Filed: Sep. 30, 2013

(65) Prior Publication Data

US 2015/0093317 A1    Apr. 2, 2015

(51) Int. Cl.
*B01J 20/02* (2006.01)
*B01J 19/20* (2006.01)
*B01J 20/30* (2006.01)
*B01J 20/04* (2006.01)

(52) U.S. Cl.
CPC .......... *B01J 20/3078* (2013.01); *B01J 20/0229* (2013.01); *B01J 20/04* (2013.01)

(58) Field of Classification Search
CPC .............................. B01J 20/0229; B01J 20/04
USPC .......................................................... 502/406
See application file for complete search history.

(56) References Cited

U.S. PATENT DOCUMENTS

| | | | |
|---|---|---|---|
| 2003/0075050 A1* | 4/2003 | Kato et al. | 96/108 |
| 2012/0225007 A1* | 9/2012 | Park et al. | 423/632 |

* cited by examiner

*Primary Examiner* — Kaj K Olsen
*Assistant Examiner* — James Fiorito
(74) *Attorney, Agent, or Firm* — Jackson IPG PLLC; Demian K. Jackson

(57) ABSTRACT

A novel method for making a $CO_2$ capture agent is provided. The capture agent is made of a calcium/iron salt. The capture agent is prevented from degradation at high temperature. The capture agent is fit to be used at various temperatures in high $CO_2$ densities for achieving high $CO_2$ capture capacity, environmental protection and low power consumption.

12 Claims, 3 Drawing Sheets

METHOD OF FABRICATING A HIGH-TEMPERATURE CO₂ CAPTURE AGENT

TECHNICAL FIELD OF THE INVENTION

Figure 1:
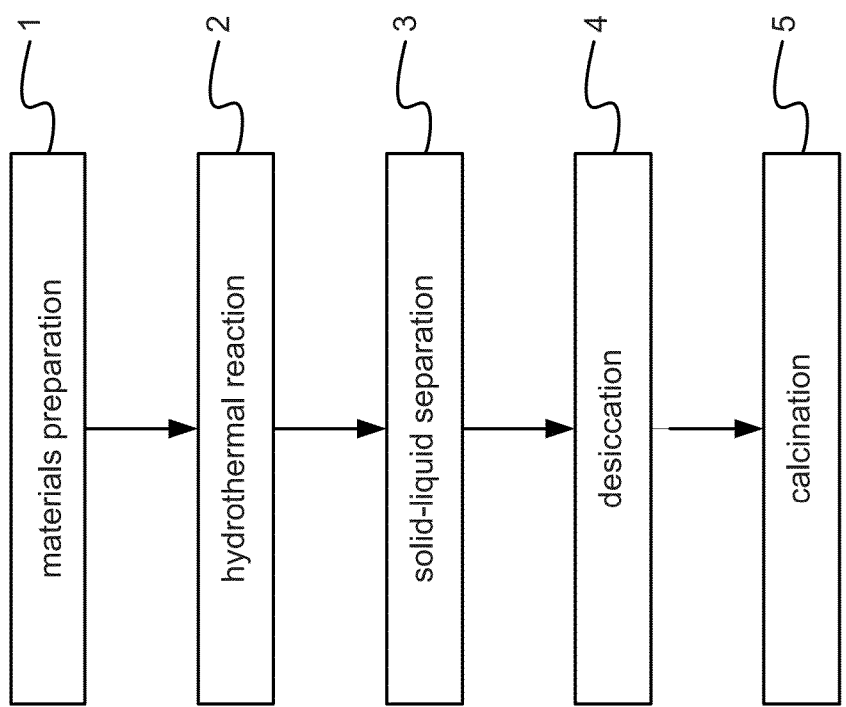

The present invention relates to fabricating a $CO_2$ capture agent; more particularly, relates to fabricating an anti-sintering $CO_2$ capture agent used in pre-combustion and post-combustion at medium/high temperature in a wide range of $CO_2$ densities to avoid deterioration of the capture agent at high temperature, where the capture agent fabricated is environmental friendliness with high carbon capture capacity and low energy penalty to be widely applied in various environments.

DESCRIPTION OF THE RELATED ARTS

A most effective technique for reducing $CO_2$ is to capture $CO_2$ from fixed and large emitting sources, like coal-fired plants, petrochemical plants, cement plants, iron plants, etc. A commonly used $CO_2$ capturing technique captures $CO_2$ in post-combustion, like using monoethanolamine (MEA), methylethanolamine (MDEA), diethonalamine (DEA), triethonalamine (TEA) and an alkali solution at 100~150 Celsius degrees (° C.). Yet, this technique has low capture capacity only, consumes high power and produces corrosive effect to endanger environment. Furthermore, modern capture techniques have the following disadvantages:

1. Modern capture techniques for fixed and large emitting sources are wet scrubbing ones, which have disadvantages of high energy penalty, high regeneration energy and low carbon capacity and may endanger environment.

2. Amine-containing capture agents can only be used at a low temperature (20~150° C.) in a low $CO_2$ concentration environment (approximately 5~15%).

3. Capture agents derived from natural minerals (like limestone, $CaCO_3$, serpentine, etc.) have the following disadvantages: (a) extra cost in transportation and pre-processing and (b) complex resource characteristics and elements contained. On being used in post-combustion, they have the following disadvantages: (a) low $CO_2$ concentration usage (5~15%) and big utilities and (b) high energy penalty. On being used in pre-combustion, they have the following disadvantages: (a) bad stability; (b) fast declining capture capacity; and (c) big amount of reactors for supplement.

4. Synthetic capture agents, like $Li_4SiO_4$ and $Li_2ZrO_3$, have the following disadvantages: (a) lower capture capacity than that of calcium oxide agents; (b) complex producing procedure, not fit for mass production; and (c) big content of Li, Zr and Si used as main body or monomer, heightening the cost.

5. Artificial calcium oxide agents are not mature, like modified, doping or sol-gel nano-CaO, $CaO/SiO_2$ or $CaO/Al_2O_3$. Their characteristics are hard to handle and result in big varieties in capture capacity.

Hence, the prior arts do not fulfill all users' requests on actual use.

SUMMARY OF THE INVENTION

The main purpose of the present invention is to fabricate an anti-sintering $CO_2$ capture agent used in pre-combustion and post-combustion to avoid deterioration of the capture agent at high temperature, where the capture agent fabricated is environmental friendliness with high carbon capture capacity and low energy penalty to be widely applied in various environments.

To achieve the above purpose, the present invention is a method of fabricating a high-temperature anti-sintering $CO_2$ capture agent, comprising steps of: (a) materials preparation, where a Ca—Fe solution and an alkaline solution are prepared and then the Ca—Fe solution and the alkaline solution are mixed and stirred to obtain a solution containing a Ca/Fe carbonate material after precipitation; (b) hydrothermal reaction, where the solution containing the Ca/Fe carbonate material is heated and kept being pressed to obtain a solution containing a layered material; (c) solid-liquid separation, where the layered material is separated out; (d) desiccation, where the layered material is dried; and (e) calcination, where the layered material is calcined to obtain a carbon capture agent of Ca≥Fe—$CO_3$; and where, at a temperature of 600° C., the carbon capture agent of Ca—Fe—$CO_3$ has an initial $CO_2$ capturing capability of 5.2~10.4 milli-mole per gram (mmol/g) and a stability of 99~100 percent (%) after 20 capture loops. Accordingly, a novel method of fabricating a high-temperature anti-sintering $CO_2$ capture agent is obtained.

BRIEF DESCRIPTIONS OF THE DRAWINGS

Figure 2:
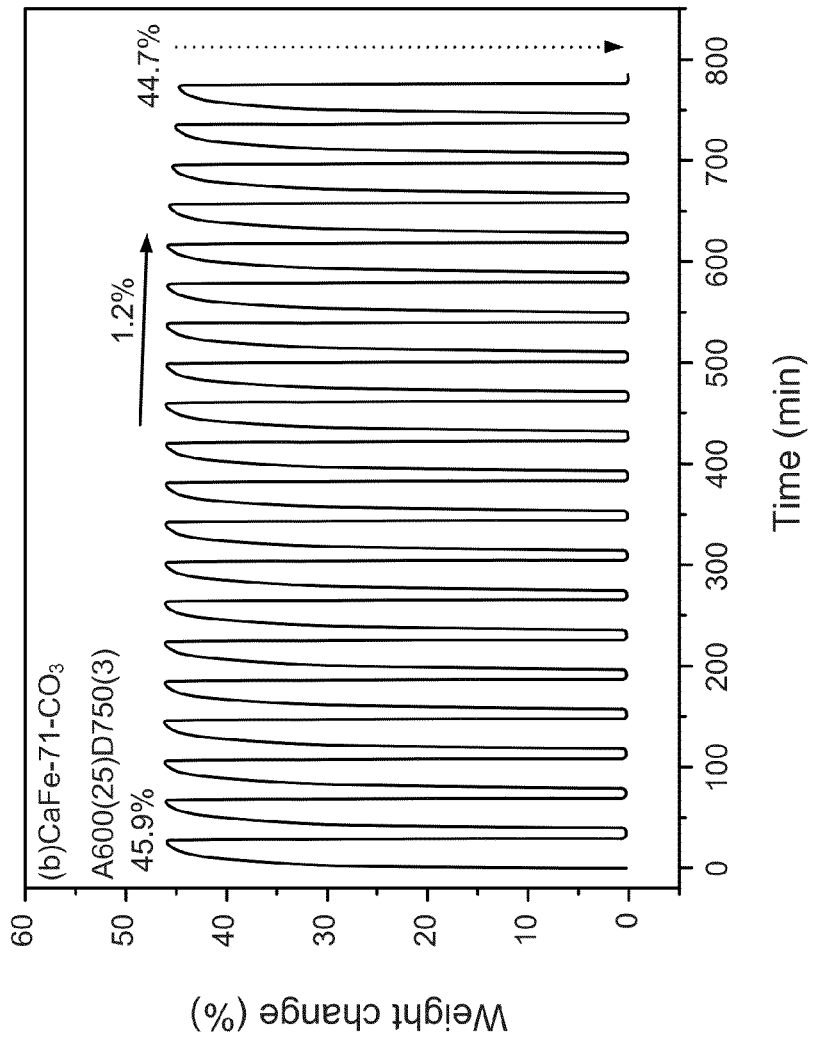

The present invention will be better understood from the following detailed description of the preferred embodiment according to the present invention, taken in conjunction with the accompanying drawings, in which FIG. 1 is the flow view showing the preferred embodiment according to the present invention; and FIG. 2 is the view showing the result of 20 capture loops by Ca—Fe—$CO_3$.

Figure 3:
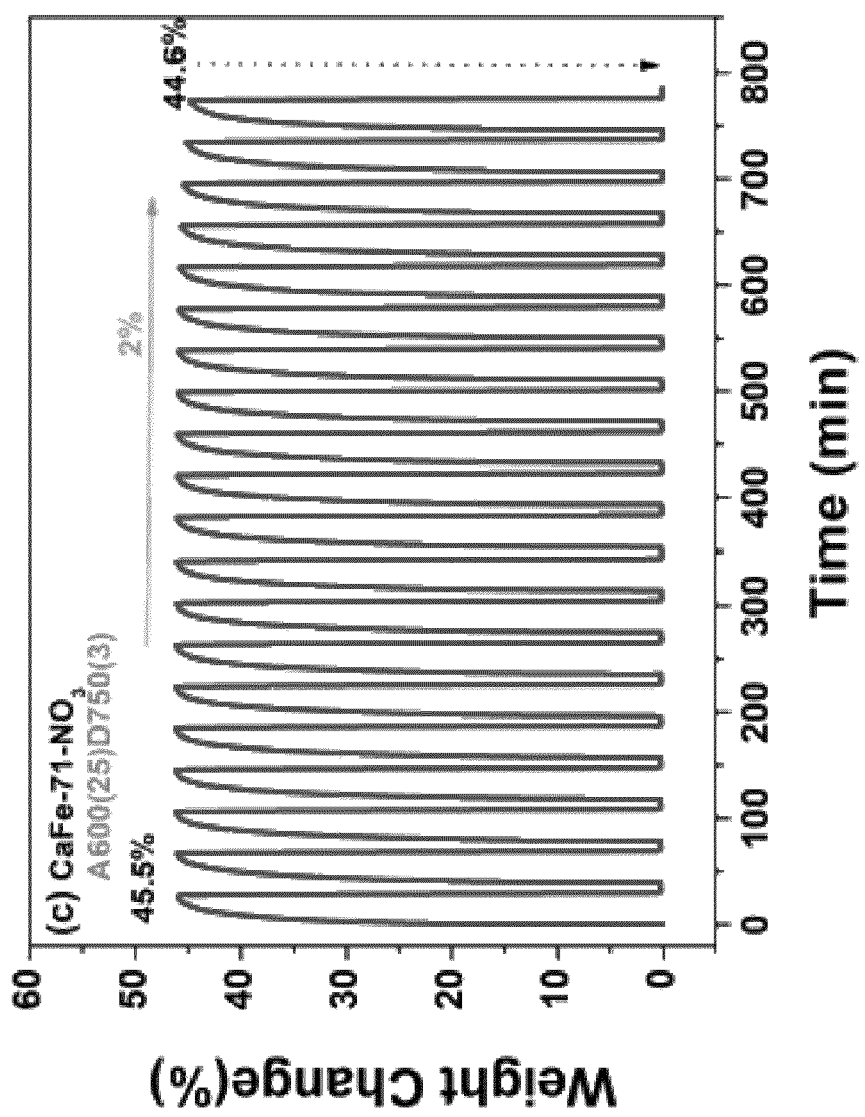

FIG. 3 is the view showing the result of 20 capture loops by Ca—Fe—$NO_3$.

DESCRIPTION OF THE PREFERRED EMBODIMENT

The following description of the preferred embodiment is provided to understand the features and the structures of the present invention.

Please refer to FIG. 1 and FIG. 2 and FIG. 3, which are a flow view showing a preferred embodiment according to the present invention; and a view showing a result of 20 capture loops. As shown in the figures, the present invention is a method of fabricating a high-temperature anti-sintering $CO_2$ capture agent, comprising the following steps:

(a) Materials preparation 1: A Ca—Fe solution and an alkali solution are separately prepared; then, the Ca—Fe solution and the alkaline solution are mixed and stirred to form a solution containing a Ca/Fe carbonate (Ca—Fe—$CO_3$) or nitrate (Ca—Fe—$NO_3$) material after precipitation. Therein, synthesis of Ca—Fe—$CO_3$ sorbents via the Ca—Fe solution, which is prepared by mixing different ratios of calcium nitrate and iron nitrate; and, the alkaline solution is prepared by mixing different ratios of sodium hydroxide and sodium carbonate. The alkaline solution is only by sodium hydroxide excluding sodium carbonate for fabricating Ca—Fe—$NO_3$ sorbents.

(b) Hydrothermal reaction 2: The solution containing the Ca/Fe carbonate or nitrate material is heated in a closed container at a temperature of 90~70 Celsius degrees (° C.) for 24 hours and kept being pressed. Thus, reactions between calcium ions and iron ions in the Ca—Fe solution and hydroxide ions and carbonate ions in the alkaline solution are speeded up for forming a solution containing a layered material;

(c) Solid-liquid separation 3: The layered material is separated out by a filtering device.

(d) Desiccation 4: The layered material is dried by a vacuum oven at a temperature of 70~50° C.

(e) Calcination 5: The layered material is calcined in a furnace at a temperature of 700~500° C. for 2 hours to form a carbon capture agent of Ca—Fe—$CO_3$ or Ca—Fe—$NO_3$.

Thus, an alkaline carbonate compound material is formed under an alkaline environment, where the compound material contains an iron and calcium oxide layered structure and either carbonates or nitrates between layers; and becomes a carbon oxide capture agent of $CO_2$. The $CO_2$ capture agent contains calcium and iron ions to be used as a dry capture agent for absorbing $CO_2$ at high temperature. The mole ratio of Ca/Fe in the capture agent can be adjusted to 2~7 times. Or, Ca—Fe—$CO_3$ can be replaced by Ca—Fe—$NO_3$ to provide negative ions between layers. At a temperature of 600 Celsius degrees (° C.), the carbon capture agent of Ca—Fe—$CO_3$ has an initial $CO_2$ capturing capability of 5.2~10.4 milli-mole per gram (mmol/g) and a stability of 99~100 percent (%) after 20 capture loops; and, on the other hand, the nitrate-based capture agent of Ca—Fe—$NO_3$ has an initial $CO_2$ capturing capability of 5.1~10.3 mmol/g and a stability of 97~98% after 20 capture loops (shown in FIG. 2 and FIG. 3). Hence, the present invention can be applied in environments of wide range of temperatures and high $CO_2$ concentration (10~40%) for achieving high $CO_2$ capture capability (>50 wt %), environmental protection and low power consumption. Thus, the present invention has the following advantages:

1. The layered structure made of a compound material formed by calcium oxide and iron oxide is used as a capture agent of $CO_2$ at medium/high temperature, which is novel, unique and competitive.

2. The ratio of calcium oxide and iron oxide in the medium/high-temperature capture agent is adjustable, where commercial resource of calcium ions can be chosen and the ratio of calcium oxide and iron oxide can be up to 2 to 7 times.

3. The medium/high-temperature capture agent can be widely applied in various environments, like a $CO_2$ concentration of 5~100% and a temperature of 400~800° C. Not to mention, the capture agent has an initial $CO_2$ capture capacity up to 11~12 mmol/g.

4. The medium/high-temperature capture agent has a tremendous stability of 99~100% after 20 capture loops.

5. The present invention cans batch-produce kilograms of the capture agent based on engineering and manufacturing methods and apparatus. At the same time, powder and granular capture agent can be manufactured by using the present invention to be used in researches of dozens-of-kW grade high temperature $CO_2$ capture reactors (e.g. fixed bed and fluidized bed).

To sum up, the present invention is a method of fabricating a high-temperature anti-sintering $CO_2$ capture agent, where the capture agent fabricated can be used in pre-combustion and post-combustion at medium/high temperature in a wide range of $CO_2$ densities to avoid deterioration of the capture agent at high temperature; and, thus, the present invention can be widely applied in various environments and be environmental friendliness with high carbon capture capacity and low power consumption.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a high-temperature $CO_2$ capture agent, comprising steps of:
    (a) separately preparing a solution containing Ca and Fe and an alkaline solution and then mixing and stirring the Ca and Fe solution and said alkaline solution to obtain a precipitate solution containing $Ca^{2+}$, $Fe^{3+}$, $Na^+$, $OH^-$, and $CO_3^{2-}$ ions;
    (b) heating and pressing the $Ca^{2+}$, $Fe^{3+}$, $Na^+$, $OH^-$, and $CO_3^{2-}$ ions from the precipitate solution to obtain a solid layered material;
    (c) drying the layered material; and
    (d) calcining the dried layered material to obtain a carbon capture agent comprising calcium carbonate and iron carbonate; and wherein, at a temperature of 600 Celsius degrees (° C.), said carbon capture agent comprising calcium carbonate and iron carbonate has an initial $CO_2$ capturing capability of 5.2 to 10.4 milli-mole per gram (mmol/g).

2. The method according to claim 1, comprising, in step (a), preparing the Ca and Fe solution by mixing calcium carbonate and iron carbonate.

3. The method according to claim 1, comprising, in step (a), preparing said alkaline solution by mixing sodium hydroxide and sodium carbonate.

4. The method according to claim 1, comprising, in step (b), heating a closed container containing the $Ca^{2+}$, $Fe^{3+}$, $Na^+$, $OH^-$, and $CO_3^{2-}$ ions precipitate solution and said alkaline solution to 90 to 70° C. for 24 hours to speed up reactions between calcium ions and iron ions in the $Ca^{2+}$, $Fe^{3+}$, $Na^+$, $OH^-$, and $CO_3^{2-}$ ions precipitate solution and hydrogen ions and carbonate ions in said alkaline solution.

5. The method according to claim 1, comprising, in step (b), filtering the layered material with a filtering device.

6. The method according to claim 1, comprising, in step (c), drying the layered material with a vacuum oven at a temperature of 70 to 50 ° C.

7. The method according to claim 1, comprising, in step (d), a furnace is used to calcine said carbon capture agent including $CaCO_3$ and $FeCO_3$ at a temperature of 700 to 500° C. for 2 hours.

8. A method of fabricating a high-temperature $CO_2$ capture agent, comprising steps of:
    (a) separately preparing a solution containing Ca and Fe and an alkaline solution and then mixing and stirring the Ca and Fe solution and said alkaline solution to obtain a precipitate solution containing $Ca(NO_3)_2$ and $Fe(NO_3)_3$;
    (b) heating and pressing the $Ca(NO_3)_2$ and $Fe(NO_3)_3$ precipitate solution to obtain a solid layered material;
    (c) drying the layered material; and
    (d) calcining the dried layered material to obtain a carbon capture agent comprising calcium nitrate and iron nitrate; and wherein, at a temperature of 600 Celsius degrees (° C.), said carbon capture agent comprising calcium nitrate and iron nitrate has an initial $CO_2$ capturing capability of 5.1 to 10.3 milli-mole per gram (mmol/g).

9. The method according to claim 8, comprising, in step (a), preparing the Ca and Fe solution by mixing calcium nitrate and iron nitrate.

10. The method according to claim 8, wherein, in step (a), the alkaline solution is a sodium hydroxide solution.

11. The method of claim 1, wherein the carbon capture agent comprises a layered structure of layers of iron oxide and calcium oxide with layers of calcium carbonate and iron carbonate between the layers of iron oxide and calcium oxide.

12. The method of claim 8, wherein the carbon capture agent comprises a layered structure of layers of iron oxide and calcium oxide with layers of calcium nitrate and iron nitrate between the layers of iron oxide and calcium oxide.

\* \* \* \* \*